United States Patent

Lipe et al.

[11] Patent Number: 5,923,897
[45] Date of Patent: Jul. 13, 1999

[54] SYSTEM FOR ADAPTER WITH STATUS AND COMMAND REGISTERS TO PROVIDE STATUS INFORMATION TO OPERATING SYSTEM AND PROCESSOR OPERATIVE TO WRITE EJECT COMMAND TO COMMAND REGISTER

[75] Inventors: Ralph A. Lipe, Clyde Hill; William G. Parry, Bellevue, both of Wash.

[73] Assignee: Microsoft Corporation, Redmond, Wash.

[21] Appl. No.: 08/625,253

[22] Filed: Apr. 1, 1996

[51] Int. Cl.⁶ .............................. G06F 9/22; G06F 13/14
[52] U.S. Cl. ........................................... 395/825; 395/834
[58] Field of Search .................................. 395/612, 712, 395/825, 882, 892

[56] References Cited

U.S. PATENT DOCUMENTS

| | | | |
|---|---|---|---|
| 3,729,713 | 4/1973 | Irwin | 395/894 |
| 4,649,514 | 3/1987 | Berger | 395/282 |
| 4,803,623 | 2/1989 | Klashka et al. | 395/828 |
| 4,901,232 | 2/1990 | Harrington et al. | 395/826 |
| 5,031,115 | 7/1991 | Hayashi | 395/101 |
| 5,214,771 | 5/1993 | Clara et al. | 395/500 |
| 5,297,067 | 3/1994 | Blackborow et al. | 364/708.1 |
| 5,317,693 | 5/1994 | Cuenod et al. | 395/829 |
| 5,386,567 | 1/1995 | Lien et al. | 395/700 |
| 5,392,269 | 2/1995 | Horie | 369/54 |
| 5,497,362 | 3/1996 | Aizawa | 369/53 |
| 5,530,872 | 6/1996 | Smeltzer et al. | 395/733 |
| 5,548,725 | 8/1996 | Tanaka et al. | 395/200.05 |
| 5,559,965 | 9/1996 | Oztaskin et al. | 395/284 |
| 5,563,865 | 10/1996 | Wheeler | 369/77.1 |
| 5,590,376 | 12/1996 | Kou | 395/839 |
| 5,630,076 | 5/1997 | Saulpaugh et al. | 395/284 |
| 5,655,148 | 8/1997 | Richman et al. | 395/828 |
| 5,720,030 | 2/1998 | Kamihara et al. | 395/183.18 |

Primary Examiner—Thomas C. Lee
Assistant Examiner—Anderson I. Chen
Attorney, Agent, or Firm—Jones & Askew, LLP

[57] ABSTRACT

A method and system for communicating extended information, including status information, from a hardware device to a computer operating system. An adapter detects changes in the status of hardware devices attached thereto, including inserted, removed or requested-to-be-removed status, places information regarding that status in registers accessible to the operating system, and generates an interrupt. In handling the interrupt, the operating system reads the status information from the registers and takes appropriate action. The described framework extensibly provides the operating system with the ability to issue commands to the adapter such as commands which obtain information on the capabilities of the adapter and the hardware devices attached thereto. Another such command enables the operating system to direct the adapter to mechanically eject a device attached thereto, such as in response to detection of request-to-be-removed status. The framework thus provides for the automatic and safely-controlled removal of a hardware device under the direction of the operating system.

21 Claims, 9 Drawing Sheets

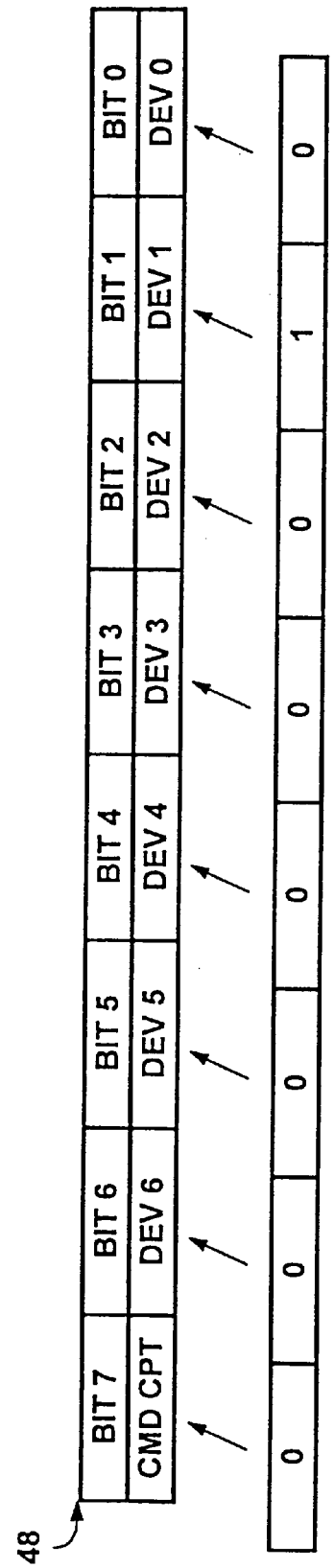

FIG. 4A

| BIT 7 | BIT 6 | BIT 5 | BIT 4 | BIT 3 | BIT 2 | BIT 1 | BIT 0 |
|---|---|---|---|---|---|---|---|
| RESVD | RESVD | RESVD | RESVD | EJECT REQ | NEW DEV | REMOVED | RESVD |

| BIT 7 | BIT 6 | BIT 5 | BIT 4 | BIT 3 | BIT 2 | BIT 1 | BIT 0 |
|---|---|---|---|---|---|---|---|
| RESVD | RESVD | RESVD | RESVD | EJECT REQ | NEW DEV | REMOVED | RESVD |
| 0 | 0 | 0 | 0 | 1 | 0 | 0 | 0 |

| BIT 7 | BIT 6 | BIT 5 | BIT 4 | BIT 3 | BIT 2 | BIT 1 | BIT 0 |
|---|---|---|---|---|---|---|---|
| ERROR | VERS | VERS | VERS | VERS | VERS | VERS | VERS |

| BIT 7 | BIT 6 | BIT 5 | BIT 4 | BIT 3 | BIT 2 | BIT 1 | BIT 0 |
|---|---|---|---|---|---|---|---|
| ERROR | RESVD | RESVD | RESVD | RESVD | RESVD | SMI | INTERRUPT |

| BIT 7 | BIT 6 | BIT 5 | BIT 4 | BIT 3 | BIT 2 | BIT 1 | BIT 0 |
|---|---|---|---|---|---|---|---|
| ERROR | RSVD | RSVD | RSVD | RSVD | ENABLED | SMI | INTERRUPT |

| BIT 7 | BIT 6 | BIT 5 | BIT 4 | BIT 3 | BIT 2 | BIT 1 | BIT 0 |
|---|---|---|---|---|---|---|---|
| RSVD | RSVD | RSVD | RSVD | RSVD | ENABLED | SMI | INTERRUPT |

| BIT 7 | BIT 6 | BIT 5 | BIT 4 | BIT 3 | BIT 2 | BIT 1 | BIT 0 |
|---|---|---|---|---|---|---|---|
| ERROR | RSVD | RSVD | RSVD | RSVD | RSVD | RSVD | RSVD |

| BIT 7 | BIT 6 | BIT 5 | BIT 4 | BIT 3 | BIT 2 | BIT 1 | BIT 0 |
|---|---|---|---|---|---|---|---|
| ERROR | DEV 6 | DEV 5 | DEV 4 | DEV 3 | DEV 2 | DEV 1 | DEV 0 |

| BIT 7 | BIT 6 | BIT 5 | BIT 4 | BIT 3 | BIT 2 | BIT 1 | BIT 0 |
|---|---|---|---|---|---|---|---|
| ERROR | RSVD | RSVD | UNLK NOTIFY | REMOVABLE | PWR MG | EJECTABLE | LOCKABLE |

FIG. 11

| BIT 7 | BIT 6 | BIT 5 | BIT 4 | BIT 3 | BIT 2 | BIT 1 | BIT 0 |
|---|---|---|---|---|---|---|---|
| ERROR | RSVD | RSVD | RSVD | EJECT REQ | NEW DEV | REMOVED | RSVD |

FIG. 12

| BIT 7 | BIT 6 | BIT 5 | BIT 4 | BIT 3 | BIT 2 | BIT 1 | BIT 0 |
|---|---|---|---|---|---|---|---|
| ERROR | RSVD | RSVD | RSVD | RSVD | RSVD | RSVD | RSVD |

FIG. 13A

| BIT 7 | BIT 6 | BIT 5 | BIT 4 | BIT 3 | BIT 2 | BIT 1 | BIT 0 |
|---|---|---|---|---|---|---|---|
| RSVD | RSVD | RSVD | RSVD | OFF | STANDBY | SUSPEND | ON |

FIG. 13B

| BIT 7 | BIT 6 | BIT 5 | BIT 4 | BIT 3 | BIT 2 | BIT 1 | BIT 0 |
|---|---|---|---|---|---|---|---|
| ERROR | RSVD | RSVD | RSVD | RSVD | RSVD | RSVD | RSVD |

SYSTEM FOR ADAPTER WITH STATUS AND COMMAND REGISTERS TO PROVIDE STATUS INFORMATION TO OPERATING SYSTEM AND PROCESSOR OPERATIVE TO WRITE EJECT COMMAND TO COMMAND REGISTER

FIELD OF THE INVENTION

The present invention relates generally to personal computer systems, and more particularly to a system and method for communicating information between a personal computer operating system and a hardware device attached thereto.

BACKGROUND OF THE INVENTION

Computer hardware devices such as disk drives, CD-ROM drives, modems and the like are increasingly becoming removable as computers become more portable and customizable. Currently, such devices are electrically designed to allow them to be "hot" plugged and unplugged from an appropriate computer port, that is, inserted or removed while the computer is powered-up and running.

In addition to the electrical considerations associated with such "hot" plugging and unplugging activity, software-based problems arise. In particular, the computer operating system is not notified of the status of the hardware device when such a hardware device is inserted or removed. As can be appreciated, this can cause substantial problems. For example, if the operating system is writing a file to the hard drive while the drive is removed, data will be lost which inevitably will have serious consequences. While the computer operating system may be able to recover from such a surprise-style removal, the user (and even the operating system) may not necessarily know that the file is not properly stored.

One solution to the above problem is to prevent such "surprise style" removals. To this end, it is believed that at least one computer vendor has implemented a specific-purpose notification mechanism dedicated to eliminating this problem. While such a solution eliminates the lost data problem, it requires intimate cooperation between a computer manufacturer and a hardware device manufacturer to agree in advance to connect their equipment together using such a specific-purpose scheme. Thus, although one hardware device vendor and one computer vendor might coordinate the ejection of devices from one type of computer, existing devices made by other manufacturers will not be able to eject in this manner, even though the similar devices otherwise conform with existing (e.g., size and communication) standards for peripheral computer devices. Indeed, such other devices may not function at all in some computers, if, for example, a device locking mechanism interferes with device insertion and/or reports to the computer that the "incompatible" device has not been installed. The known specific-purpose scheme clearly fails to meet the highly regarded quality of backwards-compatibility.

Moreover, the above-described scheme is not extensible. Thus, if devices having new features are developed, the computer systems employing this scheme will not be able to take advantage of the new features.

OBJECTS AND SUMMARY OF THE INVENTION

Accordingly, it is an object of the present invention to provide a generalized system and method for hardware devices to communicate information, including status information, to computer operating systems.

In accomplishing that object, it is a related object to provide a system and method of the above kind that is compatible with and extends the capabilities of existing standard interfaces for computer hardware devices.

Another object is to provide a system and method as characterized above that is extensible to future developments.

It is a related object to provide a system that is extensible through software modifications.

Another object is to provide such a system and method that is highly flexible and is economical to implement.

Briefly, the present invention provides a system and for communicating information from a hardware device to a computer operating system, including an adapter having a memory and means connected to the hardware device for writing information into the memory. The information includes status information related to the status of the hardware device. A computer processor is connected to the computer and is further connected for reading the adapter memory. The computer processor obtains the status information from the memory and providing the status information to the operating system. The operating system may act on the information, such as by issuing an eject request at a desired time in response to status information indicating a request to eject has been received by the adapter.

Other objects and advantages will become apparent from the following detailed description when taken in conjunction with attached drawings, in which:

BRIEF DESCRIPTION OF THE DRAWINGS

FIGS. 3A and 3B are representations of the service status register in the adapter memory of FIG. 2;

FIGS. 4A and 4B are representations of the contents of a data register in association with the service status register of FIGS. 3A and 3B;

FIGS. 5–13B are representations of the data register corresponding to various commands issued by the computer.

Figure 1:
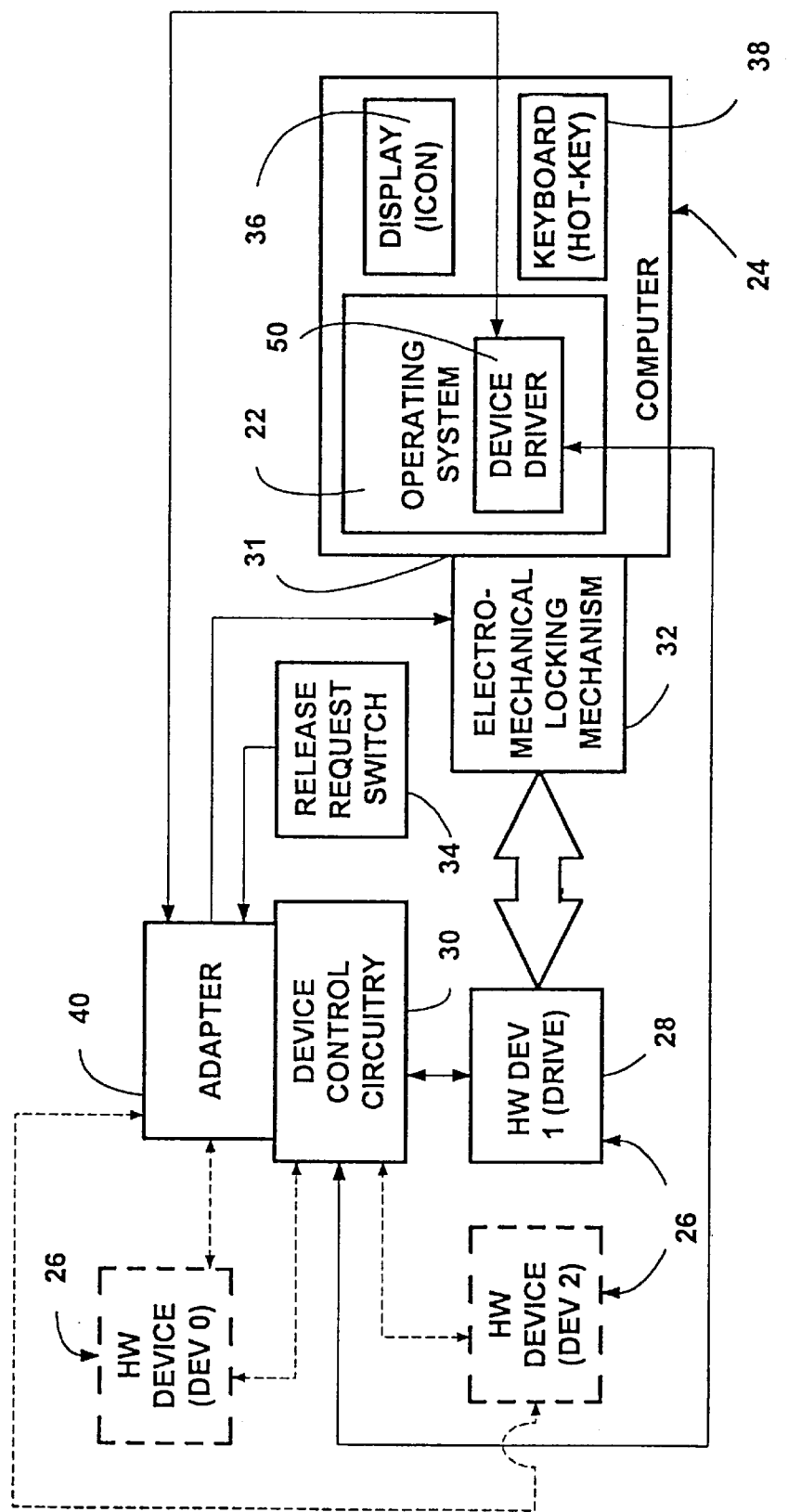
FIG. 1 is block diagram showing a representative system constructed in accordance with the invention showing a hardware device connected through an adapter to a computer.

While the invention is amenable to various modifications and alternative constructions, a certain illustrated embodiment thereof has been shown in the drawings and will be described below in detail. It should be understood, however, that there is no intention to limit the invention to the specific form disclosed. Rather, the intention is to cover all modifications, alternative constructions, and equivalents falling within the spirit and scope of the invention.

DETAILED DESCRIPTION OF THE PREFERRED EMBODIMENT

Turning now to the drawings and referring first to FIG. 1, there is shown a notification system generally designated 20 and constructed in accordance with the present invention for notifying a computer operating system 22 within a computer 24 of the status of at least one hardware device 26. As shown in FIG. 1, an exemplary hardware device 26 described herein comprises a removable hard disk drive 28 including device control circuitry 30 therefor, however it should be understood that the present invention is amenable to virtually any hardware device, including, for example, CD-ROM drives, memory cards, removable media (e.g., tape or floppy disk) drives, modems, and so on. Moreover, although the present invention primarily provides benefits with removable devices, it can be applied to hardware devices which are not readily removed from a computer system such as fixed hard drives. Finally, it should be understood that the various components in the drawing figures are only shown as being separate for logical convenience and are not necessarily physically separate from one another nor necessarily connected together as shown. For example, part of the hard disk drive circuitry 30 may be directly connected to the hard disk drive 28 while another part may be installed in the computer 24.

The device control circuitry 30 interfaces the hardware device 26 to the computer in a known manner according to a known standard. Typical types of device controllers follow IDE, SCSI, PCMCIA, AT, ESDI, ATA and/or ATAPI standards. As will be understood, the present invention extends the functionality of these and any other standard interfaces.

Although not necessary to the invention, the hard disk drive 28 is preferably inserted into a port 31 of known construction on the computer 24 and prevented from being arbitrarily removed by an electro-mechanical locking mechanism 32, such as a motor and/or solenoid. As described below, the ideal locking mechanism prevents removal (at least when the computer 24 is energized) until the operating system 22 enables its ejection. A request to remove is typically made by a user actuating a release request switch 34, which may be a dedicated button on the housing of the hard drive 28 or the computer 24, an on-screen icon on the display 36 or a keyboard 38 hot-key combination, but may alternatively be generated in any manner such as by an application program.

In accordance with one aspect of the present invention, there is provided an adapter 40 which, in addition to the standard interface for data I/O, further interfaces the hard drive 28 with the computer 24. The adapter 40 is connected to the device control circuitry 30 and knows the electrical and mechanical status of the hard drive 28, i.e., it is arranged to detect whether the drive 28 is properly inserted into the computer port 31.

Figure 2:
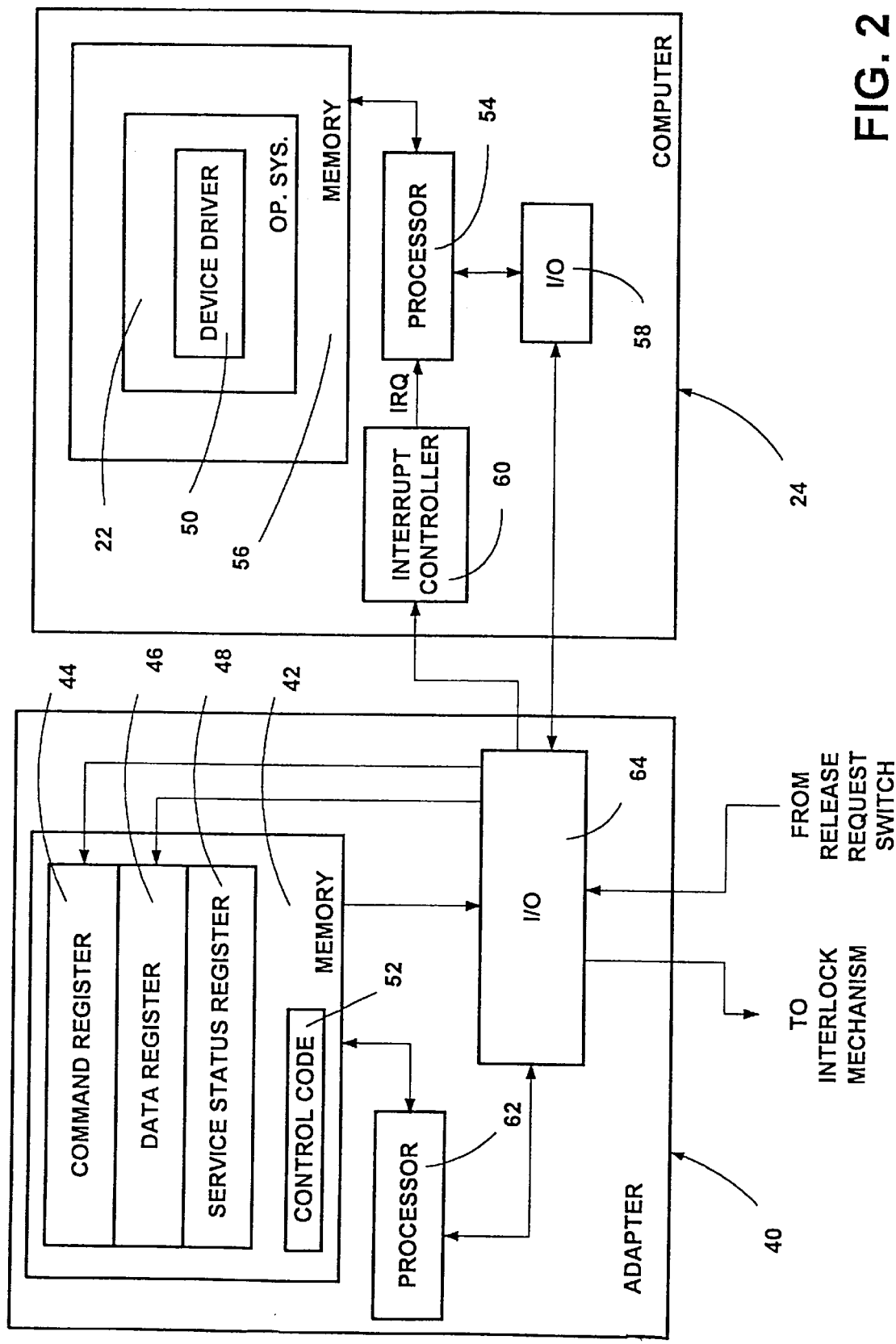
FIG. 2 is a block diagram illustrating various components including an adapter memory for communicating hardware device status information to the computer.

As shown in more detail in FIG. 2, the adapter 40 includes a memory 42 having three distinct registers therein including a command register 44, a data register 46 and a service status register 48. The adapter 40 communicates with the computer 24 via these three registers, as described below. More specifically, the operating system 22 and/or device driver 50 loaded thereby communicates with counterpart software 52 in the adapter 40 by exchanging information via these three registers 44, 46 and 48. As can be appreciated, this can be accomplished through ordinary input-output (I/O) port communication (e.g., serial or parallel) or alternative techniques such as direct memory access.

The computer 24 conventionally includes a processor 54, memory 56, input/output circuitry 58 and an interrupt controller 60. The adapter 40 includes a processor 62, which may be specific to the adapter 40 or implemented within the control circuitry 30 that controls the hard drive 28. All or part of the circuitry that constitutes the adapter 40 may be implemented in any number of ways, for example, as an application specific integrated circuit (ASIC), a programmable logic array (PLA), and so forth, and is preferably added to the hardware device 26 and/or the control circuitry 30 thereof. As can be appreciated, however, all or part of the adapter 40 may alternatively be resident in the computer 24. For example, the adapter 40 may use the computer's memory 56 as the adapter memory 42.

The adapter 40 communicates with the I/O circuitry 58 of the computer 24 through its own I/O circuitry 62. In a preferred embodiment, described in more detail below, the I/O circuitry 64 of the adapter 40 is further configured to generate an interrupt upon detection of a device status change. Accordingly, the I/O circuitry 64 of the adapter 40 is connected to the interrupt controller 60 of the computer 24 and arranged to generate a hardware interrupt on an appropriate IRQ line.

In operation, upon a change in status of the hardware device 28, including insertion or removal of the device into or from the computer port 31, or receipt of a request to remove the device (e.g., via release request switch 34), the operating system 22 is notified of the changed status by information provided to the computer 24 via the three registers 44, 46 and 48. After placing the appropriate information in the appropriate registers, the adapter control code 52 generates an interrupt to indicate that the device status has changed so that the processor 54 and a suitable interrupt handler in the operating system 22 can take appropriate action. Alternatively, but less preferably, instead of an interrupt, the operating system 22 can be arranged to regularly poll (at least one of) the three registers 44, 46 and/or 48 to look for information placed therein by the adapter control code 52 indicative of a device 28 status change. However, for simplicity hereinafter, the invention ordinarily will be described as being implemented in the interrupt-based system unless otherwise specified.

When an interrupt is generated by the adapter 40 and detected by the computer's processor 54, the interrupt handling routine in the operating system 22 reads the contents of the eight bit service status register 48. The service status register 48 is a read only (from the computer's perspective) register generally used to indicate that a particular device has undergone a status change. As shown in FIG. 3A, bits 0–6 correspond to a device number representing specific ones of the seven possible devices (DEV 0 through DEV 6) requesting service due to a status change. Bit 7 is reserved for indicating that an interrupt has been generated as a result of a command being completed, rather than a hardware device status change, as discussed below. If none of the bits are set when an interrupt is received on the IRQ line, then the operating system knows that it is the adapter requesting service.

Thus, if a device 26 identified as DEV 1 has been inserted into slot 31, as shown in FIG. 3B the adapter control code 52 will write a 00000010b into the service status register 48 (where lowercase b represents binary) prior to generating the interrupt. Only one DEVICE bit (if any) will be set per interrupt and service request. Note that if two or more devices 26 connected to the adapter 40 (FIG. 1) request service simultaneously (i.e., before the interrupt is cleared) the adapter 40 remembers this, and again generates another interrupt after the first interrupt has been serviced with the next device's number written into the service status register. Under the current register configuration, this scheme can handle up to seven simultaneously-pending notifications. As can be appreciated, if the polling model is used rather than the interrupt model, the operating system 22 may detect the status change by periodically checking the contents of the service status register's seven lowest bits for non-zero values.

Concurrent with the setting of the service status register 48, whenever the status of a device 26 changes, (just prior to generating the interrupt), the data register 46 is set by the adapter control code 52 to indicate the type of event that occurred. As shown in FIG. 4A, Bit 3 (00001000b, FIG. 4B) is set to indicate that an eject request has occurred, (e.g., release request switch 34 has been actuated), bit 2 (00000100b) to indicate that a new device has been inserted, or bit 1 (00000010b) to indicate that a device was forcibly removed by the user without an eject command having been issued. Note that bit 1 is not set upon a device ejection initiated by the operating system 22, i.e., as a result of a proper eject request. Bits indicated as reserved (bits 4–7 and bit 0) are reserved for future operations and for now are to remain at zero, although the operating system can perform a simple masking function (i.e., AND with 00001110b) to safely ignore those bits.

Thus, when the status of a device 26 is changed, the operating system 22 receives an interrupt and initially handles the interrupt by reading the service status register 48 and the data register 46. In this manner, the operating system 22 is notified of which device (e.g. hard drive 28) changed and what type of change (insertion, remove request or forcible removal) occurred. The other bits are not yet assigned to a particular event, but may be used to identify additional device status change events (e.g., removable media removed or requested to be removed from a still-connected hardware device, hardware device changing to standby mode, and so on) as deemed necessary or desirable in the future.

In keeping with the invention and as shown in FIG. 2, the operating system 22 is provided with the capability to issue commands to the adapter 40 via a command register 44, passing command parameters via the data register 46 to the adapter 40 when necessary. In a preferred embodiment, the adapter 40 is responsible for monitoring the command register 44, although the operating system can of course alternatively notify the adapter 40 of a pending command.

The command register 44 is divided into two sections, with bits 0 through 2 indicating the device number in binary (0 to 6) of the device to which the adapter 40 should apply the command, and bits 3 through 7 indicating the type of command to apply, i.e., the action to be performed by the adapter on itself or on the device. If bits 0 through 2 are all set, ("device number" equals seven), then the command is directed to the adapter 40, not a device.

Thus, the commands which the operating system 22 may issue to the adapter 40 are divided into two categories depending on where they are directed, namely adapter specific commands and device specific commands. Adapter specific commands are written into the command register 44 by the operating system 22 and are designated by setting the device number equal to seven (111b) in the three low bits of the command register. The adapter 40 responds to the adapter specific commands by writing information into the data register 46. Preferably, the adapter 40 responds to the adapter specific commands within the next input-output cycle so that the operating system 22 will be able to immediately read the response in the data register 46. For example, an adapter specific command that the operating system writes in the command register 44 as part of handling an interrupt received from the adapter 40, after reading the service status 48 and data registers 46, is a clear interrupt command to instruct the adapter to drop the interrupt request. Note that in the alternative model wherein the operating system polls the status register, the "clear interrupt" command is likewise issued to inform the adapter 40 that the status change information and device corresponding thereto has been serviced by the operating system.

The clear interrupt command is issued when the operating system writes a 00100111b (bits 3–7 equal 04 decimal, bits 0–2 equal 07 decimal to indicate the command is directed to the adapter 40) into the command register 44. No data is passed in the data register 46 with this command, and no status is returned by the adapter 40. Upon receipt of this command, the adapter 40 is responsible for clearing the interrupt line and clearing the DEV bit that is set in the service status register 48, either of which will notify the operating system 22 of the command having been received and executed by the adapter 40. At this time, as described above, the adapter control code 52 can again generate another interrupt if appropriate, for example if another device status change is simultaneously pending.

Another adapter specific command, initiated by placing a "00000111b" in the command register 44, is a "Get Version" command. When the adapter 40 receives this command, it places its version number in the low six bits of the data register 46, or sets bit number 7 to indicate an error. FIG. 5 generally shows the data register 46 after a Get Version command is responded to by the adapter, which as apparent, allows for adapter versions 0 through 127. Providing the operating system with the adapter's version number enables the operating system, for example, to load a corresponding device driver 50 as the adapter's capabilities and control code 52 evolve.

Yet another adapter specific command, issued by placing a "00001111b" in the command register, is a "Get Adapter Capabilities" command. When the adapter 40 receives this command, it places appropriate information regarding its capabilities in the low six bits of the data register 46, or sets bit number 7 to indicate an error. FIG. 6 generally shows the data register 46 after a Get Adapter Capabilities command is responded to by the adapter. Currently, bit 0 (the least significant bit)is set by the adapter control code 52 to indicate that the adapter 40 is capable of generating an interrupt on the appropriate IRQ line upon status changes, i.e., it is capable of operating within the preferred interrupt model. If not set, the operating system should employ the polling model if it wants to extend the functionality of the device control circuitry 30. Bit 1 is set high if the adapter 40 is capable of generating an SMI upon status changes, which is a processor-specific (Intel® 486 or later) privileged mode wherein the interrupt is not detected by the operating system 22 unless specially informed by the processor 54. It should be noted that the capabilities of an adapter 40 are disabled until set by the operating system in the "Set Mode" command, described below. However the adapter's capabilities are reported in response to this command even if they are currently disabled. Among other things, this allows the operating system 22 to enable only those capabilities that it can manage. For example, if the operating system recognizes that the version number of the adapter 40 is a more recent version than itself.

Another adapter specific command, issued by placing a "00010111b" in the command register, is a "Get Mode" command, for requesting the current operating mode of the adapter. When the adapter 40 receives this command, as before, it places appropriate information in the low six bits of the data register, or sets Bit 7 to indicate an error. FIG. 7 generally shows the data register 46 after a Get Mode command is responded to by the adapter 40. It should be noted that the capabilities of an adapter are disabled until set by the operating system in the "Set Mode" command, described below, and thus the mode data returned depends on whether the "Set Mode" command has been issued. Bit 0 of the data register 46 is set by the adapter 40 to indicate that the adapter 40 is capable of and enabled (by the operating system 22) to generate an interrupt upon status changes. Bit 1 is set high if the adapter 40 is capable of and has been enabled to generate an SMI upon status changes. Bit 2 is set high if the adapter 40 is capable of device status support, i.e., is compatible with these specifications, including, for example, that the adapter supports device ejection only upon command of the operating system 22.

The Set Mode command is issued by placing a "00011111b" in the command register 44. As shown in FIG. 8A, the operating system 22 writes further information into the data register 46 to accompany this command. Bit 2 of the data register 44 is set high to enable the adapter 40 to support device status notification in accordance with this specification. For example, the devices should be locked until released by the operating system 22 when this bit is set. Bit 1 is set high by the operating system 22 to enable the adapter 40 to generate an SMI upon status changes, while Bit 0 is set high by the operating system 22 to enable the adapter 40 to generate an interrupt upon status changes.

Through the use of the previously described "Get Adapter Capabilities" command, the operating system 22 generally will not attempt to set the adapter 40 to operate in a mode that exceeds its capabilities. Upon receipt of this command, the adapter 40 responds by writing data to the data register 46 according to the bit designations shown in FIG. 8B. In particular, only Bit 7 is used and only if an error occurred. For example, a potential error may be returned in bit 7 if the adapter is instructed to do something beyond its capabilities.

Another adapter specific command is a "Get Device Map" command, issued by having the operating system write a "001011111b" into the command register 44. The adapter 40 responds to this command as generally shown in FIG. 9 by returning a bitmap identifying which devices (DEV 6 through DEV 0) are presently connected to the adapter 40.

Device specific commands are directed to a specific device, and identify a specific device (DEV 0 through DEV 6) in the low three bits of the command register 44. Upon completion of a device specific command, the bit corresponding to the device will be placed by the adapter 40 in the service status register 48, and as shown in FIG. 3A, CMD CMPLT, Bit 7 of the service status register 48, will be set. An interrupt is then generated by the adapter 40, and as previously described, the interrupt handler in the operating system 22 knows via Bit 7 that the interrupt was generated in response to the command, and not to a device status change.

A device specific command issued by the operating system 22(or a device driver 50 loaded thereby) includes a "Get Device Capabilities" command, issued by writing a "00110xxxb" into the command register, where xxx indicates the device identifier (DEV 0 through DEV 6) in binary. This command seeks information on the capabilities of a particular device connected to the adapter 40. In response, the adapter 40 sets the service status register 48 as described above, and sets the data register 46 as generally shown in FIG. 10 before generating the command complete (CMD CMPLT) interrupt. Bit 7 is used to indicate an error, while Bit 4, UNLKNOTIFY, is set if the device has an LED or other indicator that signals when the device is locked. It is not set if the device cannot be locked.

Bit 3, REMOVABLE, is set if the device is capable of being removed while the computer is running, i.e., is designed for hot unplugging (and plugging). Note that Bit 3 is not used to indicate that the device has a medium therein (e.g., a floppy disk) that is removable, but rather that the hardware device itself is readily detachable from the computer. BIT 2, PWR MG, is set if the device supports power management commands, described below. Bit 1, EJECTABLE, is set if the device has a motorized ejection mechanism that supports receipt of an eject command, also described below. Devices which simply unlock a solenoid upon receipt of an eject command do not set Bit 1. Lastly, Bit 0, LOCKABLE, is set to indicate that the device is locked and cannot be removed by the user in the locked state. Bit 0 is not set if the device can be freely removed by the user at any time.

Another device specific command issued by the operating system includes a "Get Device Status" command, issued by writing a "001111xxxb" into the command register 44, where xxx again indicates the device identifier (DEV 0 through DEV 6) in binary. It is normally not necessary to issue this command because an equivalent operation is automatically performed 54 in response to a status change interrupt as discussed above. However, it is available and may be issued by the processor 54 as needed. As with the interrupt-triggered operation, this command seeks information on the current status of a particular device connected (or formerly connected) to the adapter 40. In response to this command, the adapter 40 sets the service status register 48 (Bit 7 high) as described above, and sets the data register 46 as generally shown in FIG. 11 before the adapter 40 generates the CMD CMPLT (command complete) interrupt.

Thus, as shown in FIG. 11, Bit 7 of the data register 46 is used to indicate an error. Bit 3 is set to indicate that the user desires to eject the device, for example by having actuated the release request switch 34. Bit 2 is set to indicate that a new device has been inserted, while Bit 1 would indicate that a device was forcibly removed without an eject command having been issued by the operating system.

In keeping with one aspect of the invention, another device specific command is an Eject command, issued by the operating system 22 to eject (or at least release) the device for which ejection has been requested. This command is issued as the operating system writes a "01000xxxb" into the command register 44, ordinarily in response to a request for ejection having been received. In response, the adapter 40 sets the service status register 48 to indicate a CMD CMPLT (Bit 7 set) as described above, and sets the data register 46 as generally shown in FIG. 12, i.e., Bit 7 of the data register 46 is used to indicate an error in processing the command, before the adapter 40 generates the CMD CMPLT (command complete) interrupt.

Yet another device specific command involves management of the power of a device, where certain devices are capable of being turned on or off, or placed in a standby or suspend mode, under the control of the operating system. The operating system issues the Power Management command by placing a "01001xxxb" in the command register 44. As represented by FIG. 13A, the data register 46 is concurrently written by the operating system 22 such that Bit 3 is set to turn the device off, Bit 2 to place it in a standby mode, Bit 1 to place the device in a suspend mode, and Bit 0 to turn the device on. In response, the adapter 40 sets the service status register 48 to indicate a CMD CMPLT (Bit 7 set) as described above, and sets the data register 46 as generally shown in FIG. 13B, i.e., Bit 7 is used to indicate an error in processing the command, before the adapter 40 generates the command complete interrupt. The adapter 40 then controls the power operation of the hardware device according to the contents of the data register 46.

As can be appreciated, the present invention thus provides a framework for communication between an operating system and readily removable hardware devices.

By way of example, one aspect of the invention will now be described with reference to how the operating system 22 uses the above-described registers 44, 46 and 48 to control the removal of the hard drive 28 upon receiving a proper request to remove. Two ways in which such a request to remove a device can be received include notifying the adapter 40 by actuating the release request switch 34, or by directly notifying the operating system, e.g., an appropriate remove icon clicked or a hot-key combination pressed by the user, or a command received from an application program. Either or both ways may be present on a particular system.

Figure 14:
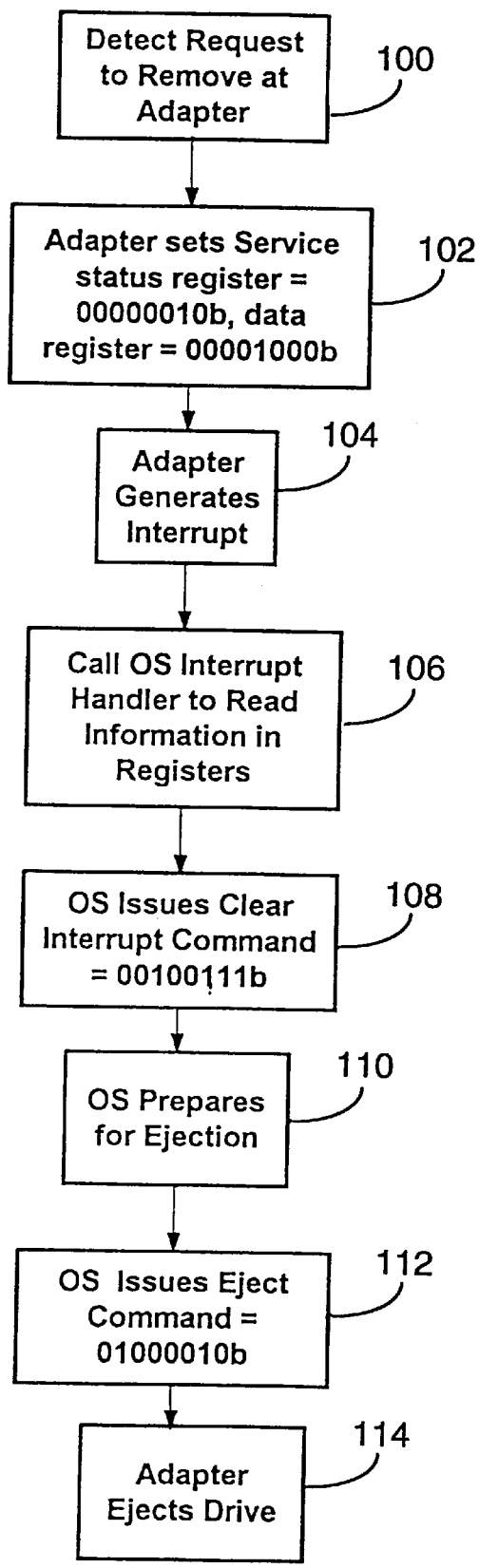
FIGS 14–16 are flow diagrams illustrating a representative flow of communication between the computer and the adapter.

As shown in the flow diagram of FIG. 14, in the situation where the adapter 40 is notified of a request to remove the hard drive 28 (DEV 1), when actuation of the release request switch 34 is detected (step 100), control passes to step 102 wherein the adapter control code 52 is executed by the adapter 40 to fill the service status register 48 (e.g. 00000010b, FIG. 3B) and data register (00001000b, FIG. 4B) as described above. The executing control code in adapter 40 then generates an interrupt at step 104. At step 106, the processor 54 responds to the interrupt by calling an appropriate interrupt handler to read the service status register 48 and data register 46, to determine which device has changed status (e.g., DEV 1, corresponding to hard drive 28) and what type of status change has occurred (request to remove), respectively. As part of the interrupt handling routine, at step 108 the operating system issues a clear interrupt command (command register set equal to 00100111b) as discussed above.

At step 110, the operating system 22 then performs procedures in preparation for the ejection of the hard drive 28. This may entail completing reads or writes to the hard drive 28, closing files, relocating temporary files, and so on. Other actions such as first obtaining confirmation from the user of the request to remove, via a pop-up window or the like, may be performed as part of this step.

After completing the preparatory steps, it is proper (safe) to eject the hard drive 28. At step 112, the operating system accordingly issues an eject command as discussed above (equal to 01000001b, where the "01000" at bits 3–7 identify the eject command and "001b" in bits 0–2 identify the hard drive's device number, DEV 1, in binary) to the adapter 40. When the eject command is received at the adapter 40, the adapter control code 52 causes the adapter 40 to issue control signals to the electromagnetic locking mechanism 32 to release the hard drive 28 (step 114). For example, the control code 52 may cause the adapter 40 to instruct the adapter's processor 62 to output a signal via I/O circuitry 64 to activate a drive motor (not shown), thereby ejecting the device 28. Alternatively, (or in addition to), such a signal can release a solenoid locking mechanism, and if desired, the operating system can notify the user of the solenoid's release and instruct the user to manually remove the drive, if necessary.

Note that in the situation where the operating system 22 is notified directly of a request to remove a specified device, the above-described eject command can be directly issued to the adapter 40 at a time when the operating system 22 determines it is appropriate.

Figure 15:
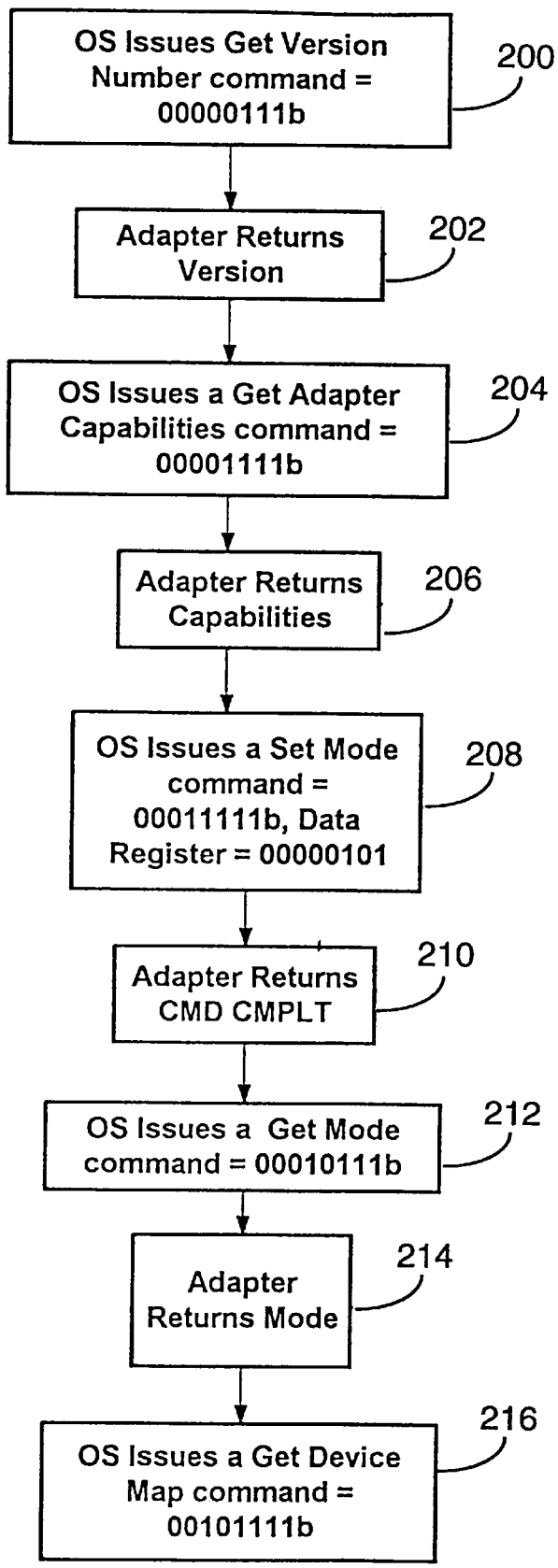

FIG. 15 shows a typical adapter initialization sequence. Upon power up, the computer BIOS may be arranged to inform the computer 24 of the location of the adapter's registers. The computer operating system 22 then uses these registers as described above to issue a Get Version Number command at step 200. At step 202, the adapter 40 responds with a version number placed in the data register 46. Thereafter, the computer issues a Get Adapter Capabilities command at step 204. After the adapter 40 responds at step 206 by placing its capabilities in the data register 46, the operating system 22 sets the adapter's mode at step 208 in accordance with the response in the data register 46. At this time the operating system can, for example, load an appropriate device driver or other routines based on the adapter's version number and/or capabilities. At this time, the adapter 40 is enabled and responds with a CMD CMPLT interrupt at step 210.

Optionally, at step 212, the operating system confirms the mode of operation of the adapter 40 by means of the above-described "Get Mode" command. The adapter 40 responds at step 214 by placing its mode in the data register 46 and issuing an interrupt with Bit 7 (CMD CMPLT) set in the service status register 48. Thereafter, the operating system 22 issues a Get Device Map command at step 216, whereby the adapter 40 responds with the map as described above in conjunction with FIG. 9. The Get Device Map command enables the operating system to individually interrogate any already connected devices to determine their capabilities and status, and to set those devices as desired using commands such as the Get Device Capabilities commands and/or the Power Management commands.

Figure 16:
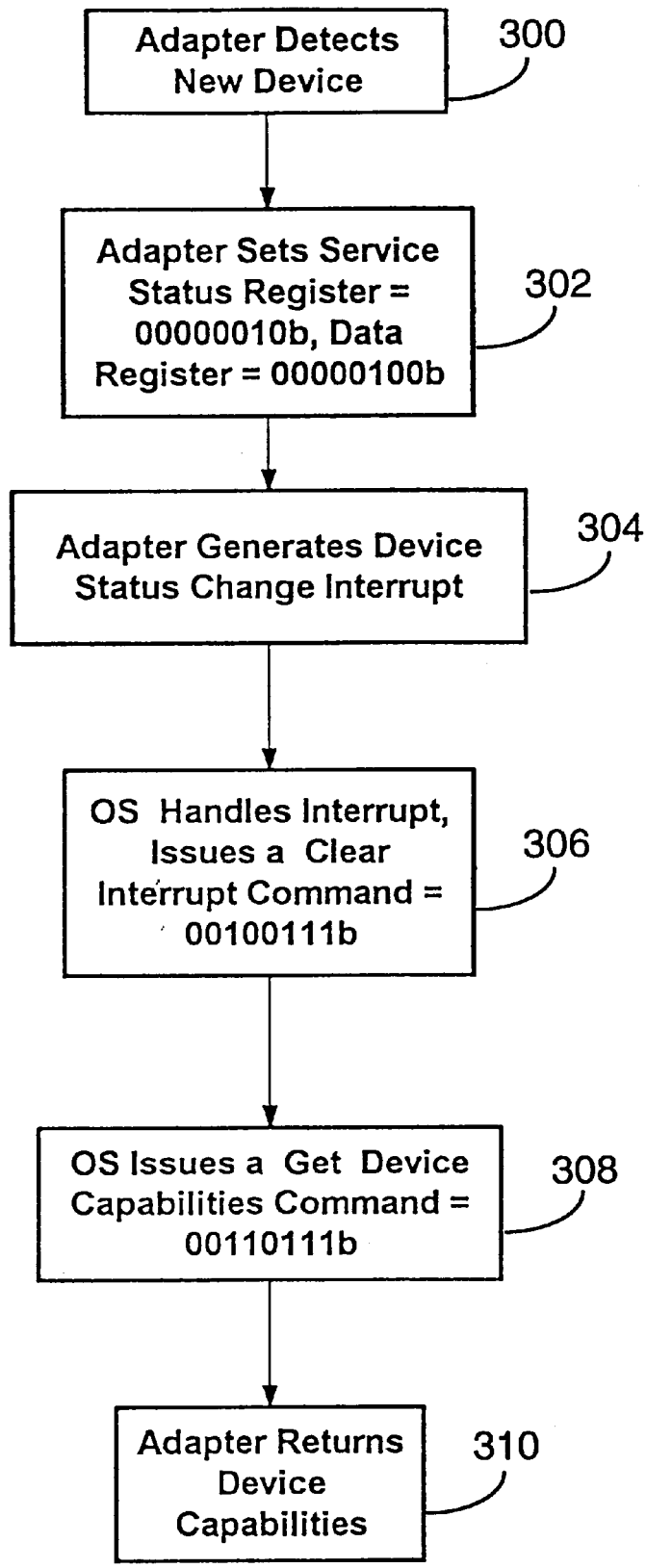

FIG. 16 shows the general steps taken when a new device is first inserted. The insertion is detected by the adapter 40 at step 300, which causes the adapter to load the service status register 48 with the device number and the data register 46 with the changed status information, and to generate a device status change interrupt as shown at steps 302–304 and as discussed above. The operating system 22 handles the interrupt as described above, and issues a clear interrupt command to the adapter 40 at step 306 as also discussed above. The operating system may also perform known steps for commencing data communication (standard data I/O) with the inserted device. Next, the operating system 22 issues a Get Device Capabilities command at step 308. At step 310, the Get Device Capabilities command is responded to by the adapter 40 by loading the data register 46 with the appropriate devices capabilities (FIG. 10) and by loading the service status register to provide the CMD CMPLT signal. After receiving the device's capabilities, the operating system 22 communicates with and directs the device in accordance with the device's capabilities as identified in the adapter's response at step 310.

As can be appreciated, the above-described framework exhibits a high degree of flexibility and extensibility. Hardware devices which have limited or even no status notification capabilities may be used with this system, while the operating system can be updated (such as by simply installing updated device drivers) to handle the most advanced hardware devices. The operating system 22 simply adjusts to the maximum capabilities of the hardware device as reported by the adapter 40.

Moreover, the operating system improves performance with drives having no status notification capabilities. For example, with the present invention, even the most basic removable drive, which can only be forcibly removed, will not be written to by the operating system 22 once the adapter 40 has indicated it has been removed. With the present invention, in the harmful scenario wherein a drive is removed while data is being written thereto, the operating system is at least notified of the status change, and may, for example, rewrite the entire file to another drive if possible and/or put a message on the screen notifying the user of a potential problem. Either or both actions taken by the operating system constitute a significant improvement over present systems where the operating system is simply not informed.

As can be seen from the foregoing detailed description, there is provided a system and method in which hardware devices generally communicate information, including status information, to computer systems. The system and method is compatible with and extends the capabilities of existing standard interfaces for computer hardware devices, and is extensible to future developments, generally through software modifications. The system and method is highly flexible yet is economical to implement.

What is claimed is:

1. A system for communicating information between a hardware device and a computer operating system running on a computer having a computer memory, comprising:

an adapter having an adapter memory resident on the adapter and separate from the computer memory, the adapter memory comprising a status register and a command register, the adapter further having means connected to the hardware device for writing information into the adapter memory, independent of a prior command issued from the operating system to the adapter, including status information related to the status of the hardware device, the command register operative for receiving commands written to the adapter from the computer operating system; and a computer processor connected to the computer and connected for reading the status register of the adapter memory, the computer processor operative for obtaining the status information from the status register of the adapter memory and providing the status information to the operating system in the computer memory, the computer processor further operative to write an eject command to the command register of the adapter memory in order to eject the hardware device from the computer.

2. The system of claim 1 wherein the status information in the adapter memory includes data indicating that the hardware device is inserted into a port of the computer.

3. The system of claim 1 wherein the status information in the adapter memory includes data representative of a request to eject the hardware device from the computer.

4. The system of claim 3 wherein the computer processor includes means for writing information into the adapter memory including an eject command for execution by the adapter in order to eject the device from the computer such that upon providing the request to eject the hardware device to the operating system, the operating system issues the eject command at a desired time.

5. The system of claim 1, wherein the adapter is further operative to generate an interrupt upon a change in status of the hardware device independent of the prior command issued from the operating system to the adapter: and wherein the computer processor is further operative to detect the interrupt.

6. A method for communicating status information from a hardware device to a computer operating system in a computer memory of a computer, comprising the steps of:

detecting a change in status of the hardware device;

writing status information into an adapter memory of an adapter, the adapter memory physically separate from the computer memory, the status information corresponding to the change in status of the hardware device independent of a prior command issued to the adapter from the computer operating system;

reading the adapter memory by the computer to obtain the status information therefrom;

providing the status information to the operating system;

writing a clear-status command from the computer operating system to a command register within the adapter memory, the clear-status command operative to clear the status information from the adapter memory; and writing an eject command from the computer operating system to the command register within the adapter memory, the eject command operative to cause the adapter to eject the hardware device from the computer.

7. A method for communicating an ejection request about a hardware device between an operating system in a computer memory within a computer system and an adapter memory resident on an adapter and separate from the computer memory, the hardware device being connected to the adapter, which is further connected to the computer system, the method comprising the steps of:

detecting a request to remove the hardware device;

setting a state of a status register in the adapter memory to indicate the request to remove the hardware device;

generating an interrupt request by the adapter in response to setting the state of the status register;

in response to the interrupt request, causing the operating system in the computer memory to read the state of the status register;

issuing an eject command from the operating system in the computer memory to a command register in the adapter memory; and executing the eject command by the adapter to cause the hardware device to be ejected from the adapter.

8. The method of claim 7 further comprising preparing for removal of the hardware device based upon the state of the status register.

9. The method of claim 7, wherein the issuing step further comprises placing the eject command within the command register on the adapter in response to the state of the status register.

10. The method of claim 9, wherein the placing step comprises placing the eject command within the command register in response to the operating system determining that communication with the hardware device is no longer required.

11. A method for communicating version information about a hardware device to an operating system within a computer memory of a computer system, the hardware device being connected to an adapter having an adapter memory separate from the computer memory, the adapter being further connected to the computer system, the method comprising the steps of:

issuing a version command from the operating system in the computer memory to the adapter memory on the adapter;

receiving the version command within a command register within the adapter memory on the adapter;

in response to receiving the version command, executing the version command within the adapter to determine the version information and to place the version information within a data register within the adapter memory on the adapter;

selecting a device driver by the operating system, the device driver corresponding to the version information within the data register;

loading the device driver to work with the operating system;

sending a mode command from the operating system to the adapter memory on the adapter;

receiving the mode command within the command register within the adapter memory on the adapter; and placing mode information within the data register, the mode information being related to the mode command.

12. The method of claim 11 further comprising the step of:

setting a mode of the adapter based upon the mode command and the mode information, the mode enabling the adapter to detect a change in status of the hardware device connected to the adapter.

13. The method of claim 12 further comprising the steps of:

sending a mode request command from the operating system to the adapter;

executing the mode request command within the adapter to determine the mode of the adapter; and returning an indication of the determined mode of the adapter to the operating system.

14. The method of claim 11 further comprising the steps of:

sending a map command from the operating system to the adapter;

executing the map command within the adapter to identify a plurality of connected devices connected to the adapter, the connected devices including the hardware device; and returning information representing the connected devices.

15. The method of claim 14, wherein the information comprises a bitmap having a plurality of elements identifying the connected devices.

16. The method of claim 15, wherein the information comprises the capability and status of the connected devices.

17. A system for communicating between an adapter and an operating system, the system comprising:

a processor;

a system memory connected to the processor, the system memory maintaining the operating system;

the adapter connected to the processor and attached to the hardware device, the adapter having a status register for monitoring a status of the hardware device and a command register operative to receive commands written to the adapter from the processor;

the adapter being operative to modify the state of the status register in response to a detected connection of the hardware device to the adapter;

the adapter being further operative to detect a request to remove the hardware device, to set the state of the data register and the state of the status register to indicate the request to remove the hardware device, and to generate an interrupt request within the adapter in response to setting the state of the data register and the state of the status register;

the processor being operative to determine capabilities of the hardware device based upon an examination of the state of the status register; and the processor being further operative to issue a command to the adapter by writing the command to the command register on the adapter.

18. The system of claim 17, wherein the adapter is further operative to load the status register with a device number identifying the hardware device and to load a data register on the adapter with status information related to the hardware device;

wherein the processor is further operative to determine the capabilities of the hardware device in response to reading the state of the status register and the state of the data register; and wherein the processor is also further operative to load a device driver maintained within the system memory in response to reading the state of the status register and the state of the data register on the adapter.

19. The system of claim 17, wherein the processor is responsive to the interrupt request generated by the adapter by reading the state of the data register and the state of the status register, to prepare for removal of the hardware device based upon the state of the data register and the state of the status register, and to issue an eject command to the adapter by writing the eject command to the command register of the adapter; and wherein the adapter is further operative to execute the eject command received from the processor, execution of the eject command causing the hardware device to be disconnected from the adapter.

20. The system of claim 19, wherein the processor is further operative to place the eject command within a command register on the adapter in response to the state of the status register.

21. The system of claim 20, wherein the processor is further operative to place the eject command within the command register in response to the operating system determining that communication with the hardware device is no longer required.

* * * * *